March 12, 1957     A. C. GLENN     2,784,902
PUMPS OR COMPRESSORS
Filed July 20, 1953               2 Sheets-Sheet 1
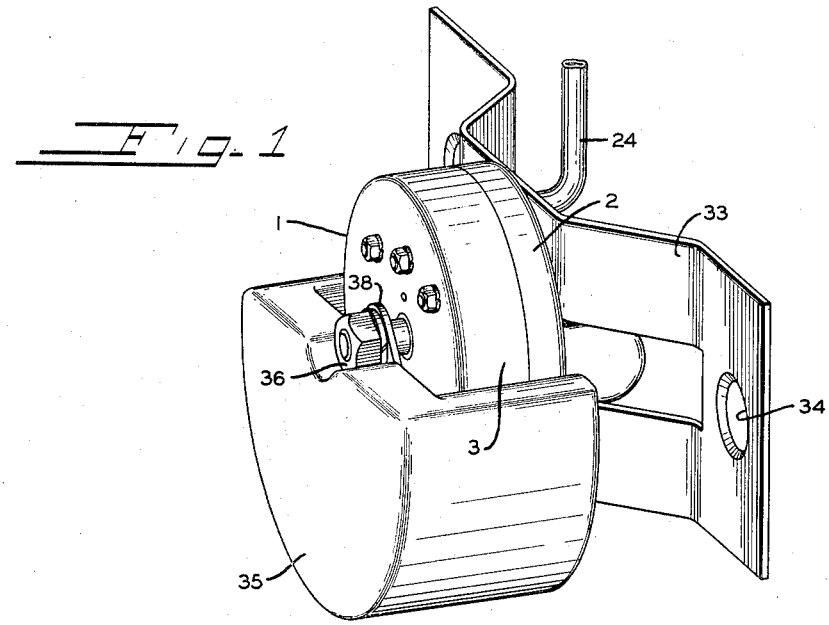
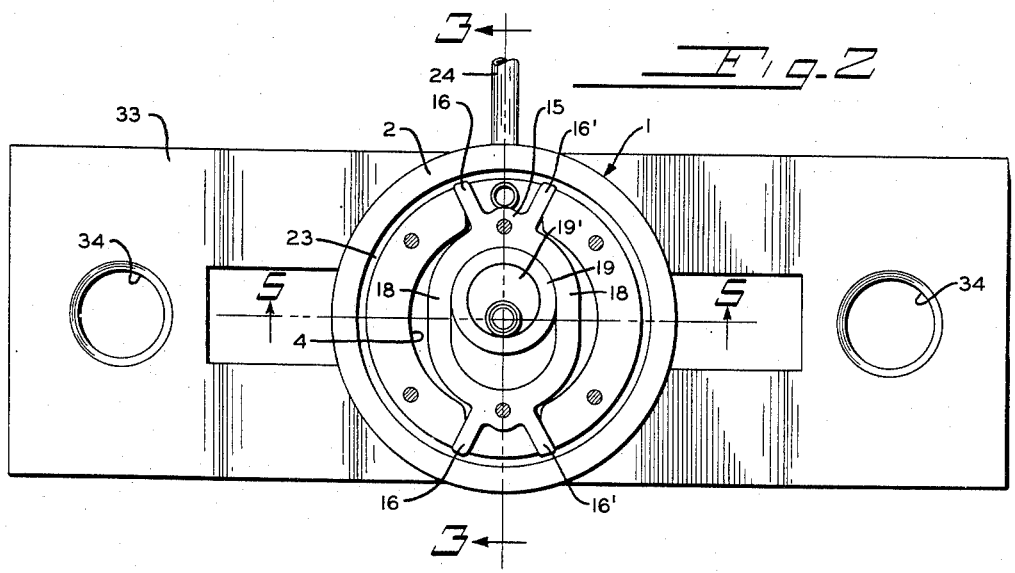
INVENTOR.
ASHLEY C. GLENN
BY
DES JARDINS, ROBINSON & KEISER
HIS ATTORNEYS March 12, 1957  A. C. GLENN  2,784,902
PUMPS OR COMPRESSORS
Filed July 20, 1953  2 Sheets-Sheet 2
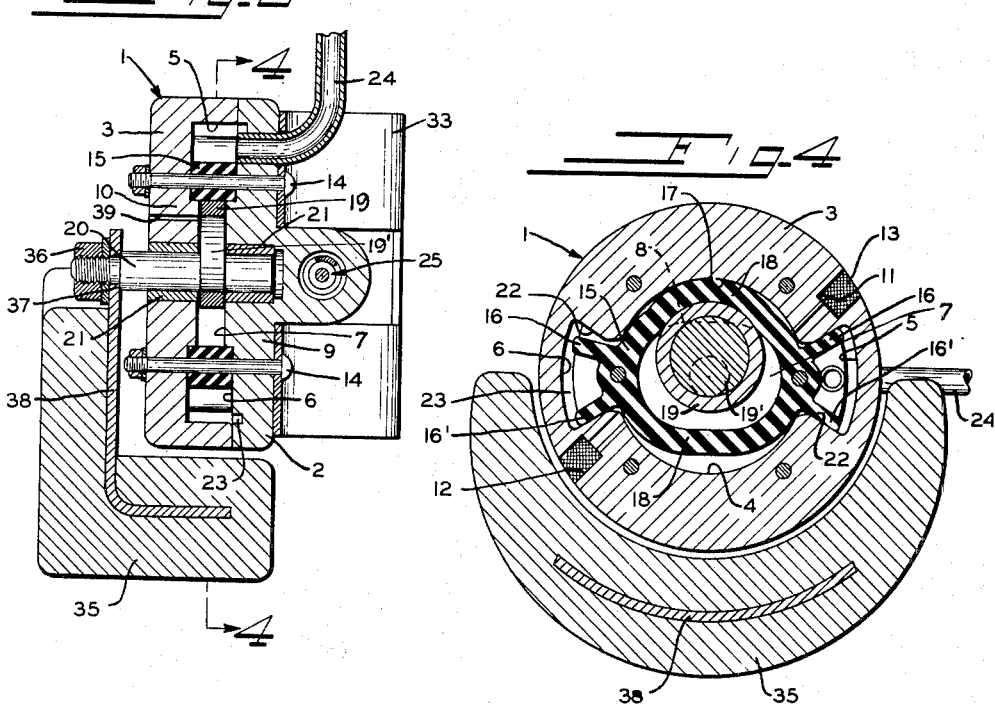
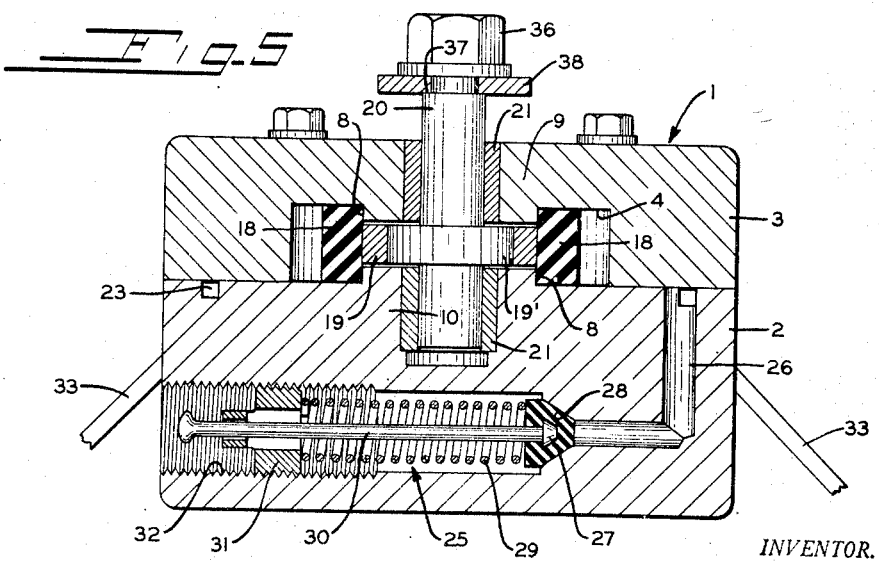
INVENTOR.
ASHLEY C. GLENN
BY
DES JARDINS, ROBINSON & KEISER
HIS ATTORNEYS

2,784,902

PUMPS OR COMPRESSORS

Ashley C. Glenn, Covington, Ky.

Application July 20, 1953, Serial No. 368,986

9 Claims. (Cl. 230—168)

This invention relates to pumps or compressors, and it particularly pertains to a fluid pump or compressor having a flexible resilient pumping ring with wall portions adapted to be flexed radially outwardly within a main chamber housing, by an actuator member, in respect to the surrounding peripheral wall of the chamber for causing the flexed wall portions of the ring to pump the fluid through the chamber from an inlet to an outlet, the flexible portions of the ring being normally in non-conformity with the co-operating peripheral wall portion of the chamber and seated on ledges formed on the side walls of said chamber. Flexible flappers or valves are provided on the ring for automatically opening and closing the outlet, said flappers or valves being housed within a sub-chamber of the main chamber and seated on radial stepped wall portions between the main chamber and the sub-chamber.

The resilient flexible ring is mounted in the main chamber with portions of its peripheral wall normally out of contact with the peripheral wall portion of said chamber, and has radial fins or flapper valves disposed adjacent the outlet or outlets to be opened and closed by the differential pressure on the inlet and outlet sides of said valves. The wall of the ring is flexed to bring normally non-conforming portions thereof in contact with the peripheral wall of the chamber to pump the fluid through the chamber from a supply source past the valves to be ejected through the outlet to a storage tank or discharged directly to the place of use. The ring is of a construction to provide a plurality of pumping portions from one or more inlets to a common outlet.

Any suitable driving means can be provided for rotating the actuator or the housing relatively to the other for flexing the ring, the actuator being preferably in the form of a cam eccentrically mounted upon a shaft journaled within the housing. The housing can be rotated relatively to the shaft, or vice versa, and the rotation may be either clockwise or counterclockwise.

The invention is illustrated as a pump unit attached to a bracket for being applied to stationary or rotary support, such as a motor vehicle wheel, for pumping air to the pneumatic tire thereon, a weight member being attached to the shaft for holding it non-rotatable while the wheel is rotated. The weight member and the pump are a unit applied to the motor car wheel. As the wheel rotates, the weight member will cause the shaft for the actuator to be held stationary, thereby causing the ring to be flexed upon its rotation within the housing about the actuator, the ring being fixed to said housing. The outlet from the pump mechanism is connected to a tire valve on said wheel, provided with a relief valve, so that the tire may be maintained at predetermined pressure, there being also a relief valve associated with the pump unit.

Accordingly, one of the main objects of the invention is a pump provided with a flexible resilient or compressible ring.

Another object of the invention is a fluid pump or compressor which is simple in construction and efficient in operation.

Another object of the invention is a pump construction with a minimum number of relatively movable parts.

Still another object of the invention is a pump having rolling contact between all the relatively movable parts.

Still another object of the invention is a pump having relatively movable members all or part of which are of a self lubricating character.

Further objects, and objects relating to details of construction and economies of operation, will readily appear from the detailed description to follow. In one instance, I have accomplished the objects of my invention by the device and means set forth in the following specification. My invention is clearly defined and pointed out in the appended claims. A structure constituting a preferred embodiment of my invention is illustrated in the accompanying drawings, forming a part of this specification, in which:

Fig. 1 is a perspective view of one embodiment of the invention.

Fig. 2 is a cross-sectional view with the weight and the front section of the housing removed.

Fig. 3 is a cross-sectional view on lines 3—3 of Fig. 2, looking in the direction of the arrows.

Fig. 4 is a cross-sectional view on line 4—4 of Fig. 3 looking in the direction of the arrows and with the housing rotated about ninety (90) degrees clockwise or counterclockwise from its position shown in Fig. 2.

Fig. 5 is another cross-sectional view showing a relief valve mounted in the housing and connected with the outlet side of the chamber.

Referring specifically to the drawings in which like numerals refer to like parts, numeral 1 is a pump housing composed of sections 2 and 3, hollowed to provide an annular main chamber 4 and two oppositely disposed sub-chambers 5 and 6, each of said sub-chambers being connected with the main chamber and with each other as hereinafter described. There is also a smaller central annular recess 7 which is narrower in width than main chamber 4, thereby forming steps 8 on the opposite common side walls 9 and 10 of the annular chamber and recess.

Inlets 11 and 12 are provided opening into the main chamber through the wall of the housing, there being preferably two of these inlets and they being oppositely disposed. They are shown as formed through the housing section 3 and have filtering means 13 therein.

The sections 2 and 3 of the housing are connected by bolts 14, there being any desired number of these, with one disposed at each of two opposite ends of the main chamber for projecting through the flexible pump ring 15 and holding said ends of said ring fixed in position in respect to the housing but permitting flexing of the intermediate wall portions between valve flappers or fins 16 and 16' extending from the opposite ends of said ring.

This flexible pump ring 15 is housed within the main chamber with these oppositely disposed valve flappers or fins 16 and 16' extending from opposite ends into the sub-chambers 5. As noted above the opposite ends of the ring are secured in position by some of the clamp bolts 14 projecting therethrough. The ring 15 is in cross section about equal to that of the main chamber so as to be in snug contact with opposite walls of the main chamber. Said ring normally seats on the stepped portions 8 of the side walls which are of a contour conforming with the central opening of the ring. The peripheral wall 17 of the chamber is generally cylindrical, and the ring is of a shape to be in non-conformity therewith so that its wall portions 18, between the opposite fixed ends, will normally be out of contact but are adapted to be flexed into contact with the adjacent wall portion 17 of the chamber by free ring 19 encircling the eccentric core 19' fixed to a shaft 20 that is journaled within the bearing sleeves 21 of the housing.

There are a pair of the valve flappers or fins 16 and 16' at each of the opposite ends of the flexible pump ring, each pair being spaced apart to normally seat against the respective end walls 22 on the sub-chambers 5 and 6 and be held normally seated by the resiliency of said flappers and the pressure built up within the sub-chambers which are on the outlet side of the valves. Fluid pumped in from the inlets (Figs. 3 and 4) is forced past a flapper valve by unseating it, after which said flapper valve will seat itself against the respective end wall by its normal resiliency and the pressure built-up in the sub-chamber on the outlet side of said valve flapper.

There is an annular groove 23 formed in the face of the housing section 3 connecting the two sub-chambers, and from one of said sub-chambers is a discharge outlet conduit 24 connected to any fluid storage tank or a pneumatic tire. It will be appreciated that the pump actuator or the housing may be rotated either clockwise or counterclockwise with respect to the other for operating the pump.

The flexible resilient pump ring may be of any flexible resilient material, such as rubber or the like, and the housing sections may be made of the same or different material. I have found "Teflon," a tetrafluoroethylene resin, and "Alathon," a polythene resin, to be especially suitable for the flexible resilient ring inasmuch as such materials are unctuous or waxy in character having a greasy feel. Accordingly there is little, if any, friction between the contacting surfaces of the ring, the housing and the actuator. The housing may be formed of the same material as the pumping ring, of metal or any other suitable material. The same is true as to the other parts such as the parts 19, 19' and 21.

The housing is preferably provided with a safety valve, denoted generally by numeral 25, said safety valve being mounted in one of the sections, such as section 2. Said safety valve is connected by the passage 26 to the annular groove 23, which, as above stated, connects the two sub-chambers 5 and 6 of the housing. Accordingly, said safety valve is connected to the discharge side of the pump. The safety valve is of any conventional construction, comprising a valve 27 yieldably pressed against its seat 28 by a spring 29 disposed about a stem 30 that has one end fitted to the valve and its opposite end slidably fitted to a plug 31 screw-threadedly fitted in the socket 32 of the housing. The plug 31 is adjustable to regulate the compression of the spring so that any predetermined pressure may be built-up on the discharge side of the pump.

The pump unit is especially adapted for motor vehicle wheels for automatically keeping the pressure of the pneumatic tires regulated when the vehicle is in use. Accordingly, it may be fitted to a vehicle wheel by the bracket member 33 having perforations 34 therein to be engaged by common bolts that hold the demountable rim carrying said tire. The pump unit will rotate with the wheel, but in order to hold the axle, together with the actuator thereon, a weight member 35 is clamped to the end of said axle by clamp nut 36, said axle having a reduced end to provide a shoulder 37 against which the weight is clamped. The weight has an angular arm 38 having one end embedded therein and its opposite end extended for making the connection with the axle.

From the foregoing description, the operation of the pump is apparent. The axle carrying the pump actuator may be rotated clockwise or counterclockwise in respect to the housing by any driving member. Or, as illustrated in the drawings, the housing member may be mounted upon a rotatable means, such as a motor vehicle wheel, to be rotated relatively to the actuator which is held in non-rotatable position by the weight. Fluid will be drawn in successively through the inlet and through the chamber by the flexible ring to be forced past the flapper valves to the outlet or discharge side of the pump. In order to prevent any vacuum being built-up in the chamber, between the ring and the actuator, a vent 39 is provided through the wall of the housing, although sufficient leakage from this chamber would be permitted through the axle bearing. It is apparent that the only wear to which the ring is subjected is that between said ring and the actuator and they have rolling contact.

I am aware that there may be various changes in details of construction without departing from the spirit of my invention, and, therefore, I claim my invention broadly as indicated by the appended claims.

Having thus described my invention, what I claim as new and useful and desire to secure by U. S. Letters Patent, is:

1. A rotary pump comprising a chambered housing having a main chamber with an interior circular wall portion terminating in oppositely disposed sub-chambers, each being offset outwardly radially from the wall of the main chamber to provide a valve seat, an inlet provided for one sub-chamber and an outlet provided for the other sub-chamber, a flexible resilient member mounted in the main chamber having a wall portion out of contact with the interior wall of said main chamber adapted to be flexed radially into contact with the interior wall of said main chamber for pumping fluid therethrough, a flexible valve flap on the flexible member extending into each of the sub-chambers cooperating with the valve seats for opening and closing the inlet and outlet to and from the main chamber, and actuating means mounted in the housing for flexing the flexible resilient member in respect to the interior wall of the main chamber.

2. The rotary pump of claim 1 in which the opposite ends of the flexible resilient member are secured to the housing.

3. The rotary pump of claim 1 in which the flexible resilient member is in the form of a ring and the actuating means is an eccentric within the ring shaped member.

4. The rotary pump of claim 1 in which two valve seats are provided in each off-set sub-chamber, and a pair of flexible valve flaps are formed on opposite ends of the ring, one pair of valve flaps for each of the two valve seats in each of the sub-chambers.

5. A rotary pump comprising a chambered housing having a main chamber with an interior circular wall portion terminating in oppositely disposed sub-chambers, each being offset outwardly radially from the wall of the main chamber to provide a valve seat, an inlet provided for one sub-chamber and an outlet provided for the other sub-chamber, a flexible resilient member mounted in the main chamber having a wall portion normally out of contact with the interior wall of said main chamber adapted to be flexed radially into contact with the interior wall of said main chamber for pumping fluid therethrough, a flexible valve flap on the flexible resilient member extending into each of the sub-chambers cooperating with the valve seats for opening and closing the inlet and outlet to and from the main chamber, a passage provided in the chambered housing for connecting the two sub-chambers, and actuating means mounted in the housing for flexing the flexible resilient member in respect to the interior wall of the main chamber.

6. The rotary pump of claim 5 provided with a vent between the actuating means and said flexible resilient member.

7. A reversible rotary pump comprising a chambered housing having an annular circular chamber with oppositely disposed sub-chambers offset radially outwardly therefrom to provide oppositely disposed valve seats in each of said sub-chambers, an inlet provided for one of the sub-chambers between its oppositely disposed valve seats, an outlet provided for the other sub-chamber between its oppositely disposed valve seats, a flexible resilient member having a ring shaped body portion normally radially spaced from the surrounding wall of the annular chamber, a pair of valve flaps on opposite ends of said ring shaped body portion of the flexible member extending into the sub-chambers, each valve flap of the two pairs being normally seated on the valve seats, and eccentric means journaled in the ring shaped body of the flexible resilient member for radially flexing said ring shaped body to pump fluid through the chamber.

8. The reversible rotary pump of claim 7 in which the flexible resilient member is secured to the housing adjacent the valve flaps.

9. The reversible rotary pump of claim 8 having a connecting passage through the housing between the sub-chambers.

References Cited in the file of this patent

UNITED STATES PATENTS

| 2,103,474 | Lindberg | Dec. 28, 1937 |
| 2,246,487 | Fraser | June 17, 1941 |
| 2,380,283 | Van Ranst | July 10, 1945 |